April 21, 1925.
F. J. METZGER
1,534,279
ILLUMINATED INSTRUMENT
Filed May 23, 1922
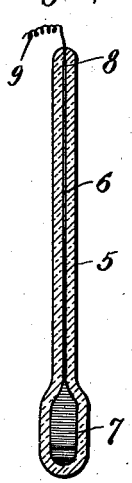
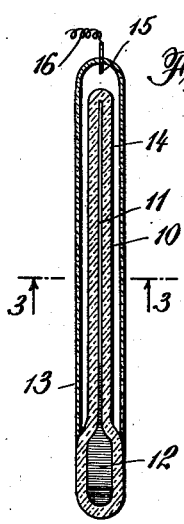
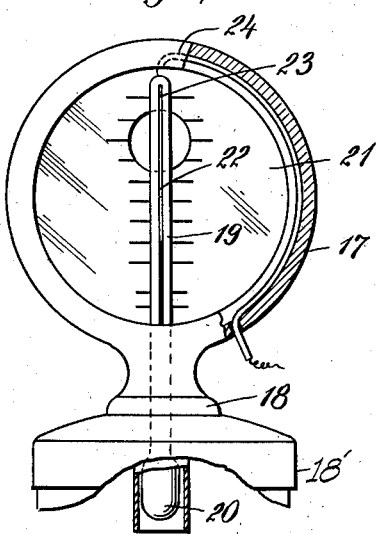
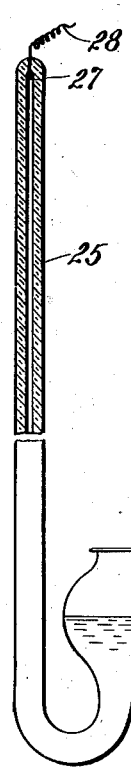
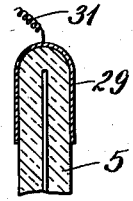
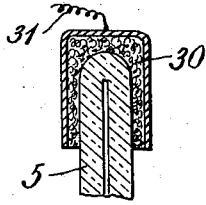
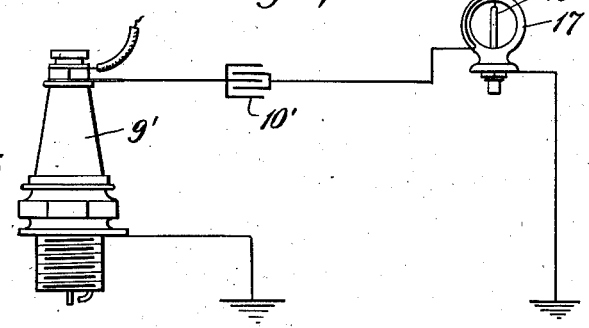
INVENTOR
Floyd J. Metzger
BY Pennie Davis Marvin & Edmonds
his ATTORNEYS Patented Apr. 21, 1925.

1,534,279

UNITED STATES PATENT OFFICE.

FLOYD J. METZGER, OF NEW YORK, N. Y., ASSIGNOR TO AIR REDUCTION COMPANY, INCORPORATED, A CORPORATION OF NEW YORK.

ILLUMINATED INSTRUMENT.

Application filed May 23, 1922. Serial No. 562,938.

*To all whom it may concern:*

Be it known that I, FLOYD J. METZGER, a citizen of the United States, residing at New York, in the county of New York, State of New York, have invented certain new and useful Improvements in Illuminated Instruments; and I do hereby declare the following to be a full, clear, and exact description of the invention, such as will enable others skilled in the art to which it appertains to make and use the same.

This invention relates to temperature and pressure gauges, and particularly to the illumination of devices of this character whereby readings therefrom may be taken at night or when the device is otherwise obscured by darkness.

A primary object of the invention is to provide a self-contained illuminated temperature or pressure gauge of simple and inexpensive construction.

A special application of the invention is in thermometers such as are employed to indicate the temperature of the circulating water in cooling systems for internal combustion engines. It is to be observed, however, that the invention is not limited to such use, being applicable generally to thermometers and barometers and to other measuring instruments.

The invention depends upon the use of a gaseous medium having a high electrical conductivity or low dielectric strength whereby an electrical discharge resulting from the passage of a high tension current through the gas causes illumination thereof. Neon or helium is preferably employed because of their relatively high electrical conductivity, but other gases such as air under very reduced pressures or carbon dioxide, nitrogen or argon under reduced pressures may be used. In the practical application of the invention, neon under a pressure of about one-half atmosphere is preferred. Other gases require a proportionally greater current and are not so satisfactory. In the case of a thermometer the gas employed may be introduced to the bore of the instrument above the mercury column, or if the thermometer has an external jacket or tube the outer tube may be filled with the desired gas. To insure illumination it is sufficient to provide an electrode in the upper end of the thermometer or to surround the upper part of the thermometer with a conducting medium capable of exercising a capacity effect, for example, a metal cap, a sheet of tin foil or material such as metal wool, enclosed in a suitable housing. The electrode or conducting medium is connected by a suitable conductor to a source of high tension current.

The source of high tension current may be an induction coil, but when the invention is applied to thermometers for use in connection with circulating systems of internal combustion engines, the source of current is available in the ignition system of the engine. Thus the conductor may be connected to the high tension ignition circuit, for example, to one of the spark plugs of the engine which is supplied with current at high tension for ignition purposes. Preferable a condenser of suitable capacity or a choke coil is provided in the circuit leading from the high tension circuit or spark plug to the thermometer to limit the amount of current flowing to the latter. Since an extremely small amount of current is sufficient to accomplish the desired result, current may thus be taken from the ignition system without interfering with the proper functioning of that system.

In applying the invention to barometers, the gas may be disposed above the mercury column in the space which is normally under vacuum. The gas in this case is preferably at a pressure of approximately 10 mm., and the introduction of the gas to the space above the mercury column will not interfere with the proper operation of the barometer, although a proportionate correction will be necessary to take account of the pressure of the gas.

The preferred embodiments of the invention are illustrated in the accompanying drawing, it being understood that the invention is not limited to the particular structures shown. In the drawing—

Fig. 1 is an elevation partially in section of a thermometer embodying the invention;

Fig. 2 is a similar view illustrating a different form of thermometer in which the gas is disposed in the outer tube;

Fig. 3 is a section on the line 3—3 of Fig. 2;

Fig. 4 is a similar view illustrating a device embodying the invention which is adapted to be used in determining the temperature of the circulating system of an internal combustion engine;

Fig. 5 is a sectional view of a barometer embodying the invention;

Figs. 6 and 7 are details in section illustrating different arrangements for delivering current; and Fig. 8 is a diagrammatic illustration of a typical electrical circuit.

Referring to Fig. 1 of the drawing, 5 indicates a thermometer having a bore 6 and the usual mercury bulb 7 at the lower end thereof. The space in the bore above the mercury column contains a suitable gas, for example, neon at a reduced pressure, preferably about one-half atmosphere at normal atmospheric temperature. The upper end of the thermometer tube is provided with an electrode 8 extending into the bore. An independent induction coil or other source of high tension current may be used but preferably the electrode is connected by a conductor 9 to a source of high tension current such as one or more spark plugs 9' (Fig. 8). A condenser 10' should be disposed in the circuit if current is drawn from a spark plug. When current is supplied through the conductor 9, the gas within the tube will glow with a reddish-orange light if the bore contains neon, and the length of the illuminated portion will clearly indicate to the observer the height of the mercury column.

In Fig. 2 of the drawing a similar thermometer is illustrated, comprising a tube 10 with a bore 11 and a mercury bulb 12. The tube 10 is surrounded by an outer tube 13 in which the usual calibrated scale 14 is disposed. In this case the outer tube 13 contains a suitable gas, for example, neon, at a pressure of approximately one-half atmosphere at atmospheric temperature. An electrode 15 is provided at the upper end of the tube 14 and is connected by a conductor 16 to a source of high tension current. When current is supplied, the entire tube 14 will be caused to glow by the electrical discharge through the gas. If the inner tube 11 is placed near one side of the outer tube 14, all of the glow will appear behind the tube 11 so that the mercury column and the space above is illuminated. Since the bore of the inner tube 11 contains some mercury vapor and this vapor when excited by an electrical discharge gives off a bluish-grey light, a striking contrast is provided between the light in the inner tube and that in the outer tube, so that the thermometer may be very easily read.

Referring to Fig. 4, 17 indicates a frame provided with a base 18 which is adapted to be inserted in an opening in the radiator cap 18' of a motor-driven vehicle. A thermometer 19 is supported in the frame 17 with its bulb 20 depending into the space above the water flowing through the radiator. A suitable scale 21 is also supported in the frame 17 so that the position of the top of the mercury column in the bore 22 of the thermometer tube may be readily interpreted. The upper part of the bore 22 contains a suitable gas, for example, neon, under a pressure of approximately one-half atmosphere at atmospheric temperature, and an electrode 23 is provided at the upper end of the thermometer which may be connected by a conductor 24 to the ignition system of the motor-driven vehicle as hereinbefore described. Obviously a thermometer such as is illustrated in Fig. 2 may be substituted for that as shown in Fig. 3. The illumination of the thermometer by the glow produced in the bore thereof will permit reading of the thermometer from the driver's seat at night when the thermometer would be otherwise invisible. This adaptation of the invention is particularly advantageous because it enables the driver of a vehicle to observe at all times the temperature of the circulating water.

In Fig. 5 of the drawing a barometer is illustrated which may consist of a tube 25 terminating at its lower end in the usual well 26 which is filled with mercury.

The usual adjusting means may be provided, the details of the construction of the barometer forming no part of the present invention which is applicable to all similar instruments in which the gas may be introduced and utilized as hereinbefore described. In the present instance, the space in the tube 25 above the mercury may contain a suitable gas such as neon under a reduced pressure, preferably of approximately 10 mm. at atmospheric temperature. The upper end of the tube 24 is provided with an electrode 27 which may be connected by a suitable conductor 28 to a source of high tension current, and when current is caused to pass through the gas as hereinbefore described, the glow within the tube will assist in the determination of the level of the mercury therein. The application of the invention to barometers is particularly desirable in commercial plants where barometric readings must be taken at intervals and where the barometers are frequently so disposed as to be readable only with considerable difficulty.

As indicated in Figs. 6 and 7, the electrode at the top of the thermometer or barometer may be replaced by a metal cap or coating 29 or by a packing of metal wool 30, the coating or packing acting as a capacity medium and being connected by a conductor 31 to a source of high tension current. The mercury end of the thermometer or barometer is grounded but it is not necessary to actually connect the mercury to the ground. Any surrounding metal structure will disperse the current.

From the foregoing it will be observed that I have provided a simple and effective means of illuminating measuring instruments of the character described and that the invention is of broad application, being adaptable to instruments of various kinds other than those specifically described. The illumination of the instrument permits reading thereof from a distance with greater accuracy, and particularly the reading of instruments which are not otherwise properly illuminated.

Obviously the details of construction and proportions of instruments embodying the invention may be widely varied without departing therefrom or sacrificing any of the advantages thereof.

I claim:

1. A measuring instrument having an enclosed space, the length of which varies with the conditions which the instrument is adapted to measure, and means for defining the length of the space by causing an electrical discharge therethrough.

2. A measuring instrument having an enclosed space containing neon, the length of which varies with the conditions which the instrument is adapted to measure, and means for defining the length of the space by causing an electrical discharge therethrough.

3. A measuring instrument including a hollow, light-transmitting body containing a conducting liquid, the space above the liquid containing a gas which may be caused to glow by an electrical discharge, and means for delivering high tension electric current to the gas, thereby illuminating the portion of the body above the liquid.

4. A measuring instrument including a hollow, light-transmitting body containing mercury, the space above the mercury containing a gas which may be caused to glow by an electrical discharge, and means for delivering high tension electric current to the gas, thereby illuminating the portion of the body above the mercury.

5. A measuring instrument including an indicator having a movable column of conducting liquid, said indicator also having a space containing a gas which may be caused to glow by an electrical discharge, and means for delivering high tension electric current to the gas to illuminate the indicator.

6. A measuring instrument including an indicator having a movable mercury column, said indicator also having a space containing gas of low dielectric strength, and means for delivering high tension electric current to the gas to illuminate the indicator.

7. A temperature gauge for the circulation of the cooling system of an internal combustion engine, including a frame, a thermometer supported therein and having a mercury bulb depending therefrom, the space above the mercury in the bore of the thermometer containing neon, and means for supplying high tension current to the neon to illuminate the thermometer.

8. A temperature gauge for the cooling system of an internal combustion engine including a frame, a theremometer supported therein and having a mercury bulb depending therefrom, said thermometer having also a space containing neon and means for delivering high tension electric current to the neon to illuminate the thermometer.

In testimony whereof I affix my signature.

FLOYD J. METZGER.